Oct. 4, 1966 G. K. SWISTUN 3,276,986
ELECTROLYTIC APPARATUS FOR TREATMENT OF
THE TIPS OF GLASS BEADED LEADS
Filed Oct. 26, 1962 2 Sheets-Sheet 1

VIBRATOR TABLE

INVENTOR.
GWIDO K. SWISTUN
BY James and Franklin
ATTORNEYS

Oct. 4, 1966 G. K. SWISTUN 3,276,986
ELECTROLYTIC APPARATUS FOR TREATMENT OF
THE TIPS OF GLASS BEADED LEADS
Filed Oct. 26, 1962 2 Sheets-Sheet 2
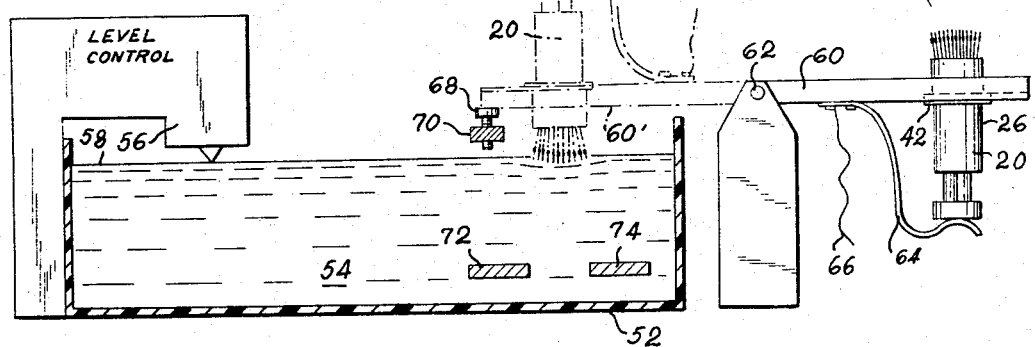
FIG. 6
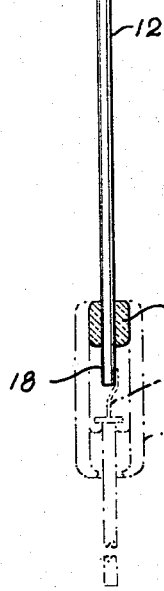
FIG. 8
FIG. 9   FIG. 10
FIG. 7
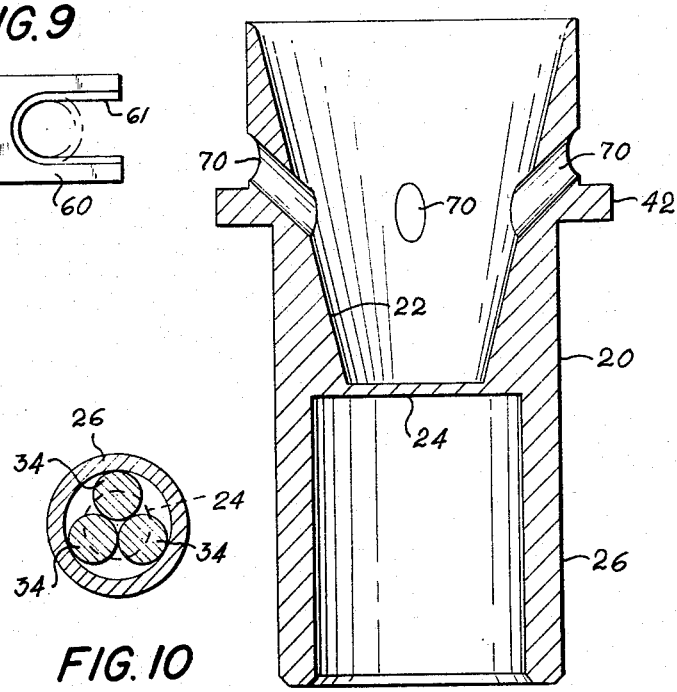
INVENTOR.
GWIDO K. SWISTUN
BY
ATTORNEYS

United States Patent Office 3,276,986
Patented Oct. 4, 1966

3,276,986
ELECTROLYTIC APPARATUS FOR TREATMENT OF THE TIPS OF GLASS BEADED LEADS
Gwido K. Swistun, North Smithfield, R.I., assignor to General Instrument Corporation, Newark, N.J., a corporation of New Jersey
Filed Oct. 26, 1962, Ser. No. 233,300
16 Claims. (Cl. 204—224)

This invention relates to the electrolytic treatment of the tips of glass beaded leads, and more particularly copper sheathed leads for glass-enclosed diodes.

In one well known form of glass diode the semi-conductor metal, typically germanium or silicon, and a resilient contact or "whisker wire" are housed in a tiny glass cylinder which may be, say ¼ inch long and ⅟₁₀ inch in diameter. The leads may be made of Dumet, which has a copper sheath, or of copper plated Kovar. The semiconductor is preliminarily secured with its lead in one end of the glass cylinder, usually by means of a glass bead. The contact spring is carried by the inside tip of the other lead, which also has a glass bead, and this bead serves as a closure for the cylinder when adding the lead with its contact spring to the cylinder. The mounting of the contact spring on the tip of the lead is usually by welding, but this has caused considerable subsequent difficulty in the operation of the diode because of flaking of copper from the tip during the final sealing, that is, the sealing of the bead into the cylinder.

In an effort to overcome this difficulty one expedient has been to nickel plate the entire lead, but this is undesirable because nickel will not take subsequent tinning of the lead. Silver would be better, but is too costly. I have found it feasible to electrolytically treat the tip only of the lead. One such treatment nickel plates the tip, and a different and preferred treatment strips the copper coating from the tip. The present invention includes either treatment, and one general object of the invention is to electrolytically treat the tips only of glass beaded leads. A further object is to provide apparatus for this purpose. Another object is to provide apparatus which will quickly and readily handle a large number of leads, say four hundred leads at a time as a unit. A number of such units maybe handled in multiple. Still another object is to provide apparatus which works conveniently with standard containers for such leads, which at the present time pack four hundred leads in a small cylindrical container.

To accomplish the foregoing general objects, and other more specific objects which will hereinafter appear, my invention resides in the apparatus elements and their use and relation one to another, as are hereafter more particularly described in the following specification. The specification is accompanied by drawings in which.

Figure 1:
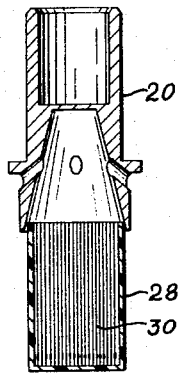
FIG. 1 shows the application of a frusto-conical cup to a conventional cylindrical container.

FIG. 6 schematically illustrates apparatus for the present purpose;

FIG. 7 shows a preferred form of cup;

FIG. 8 represents a typical glass-beaded lead to which the present improvement is applicable; and FIGS. 9 and 10 show details.

Referring to the drawings, and more particularly to FIG. 8, I there show a typical lead 12 with a glass bead 14 thereon. The lead is usually made of Dumet, which has a copper sheath, but it might consist of another metal, such as copper-plated Kovar. The glass bead 14 is used to seal one end of a small glass cylinder, indicated in broken lines at 16. This is here shown as already having its other glass seal and lead and semiconductor metal, for example germanium or silicon.

In the case of one popular form of glass diode a resilient contact spring or whisker 19 is preliminarily secured to the tip 18, this being done before assembly with the glass case 16.

The resilient contact is welded to the lead tip, and perhaps because of the welding operation, the copper coating subsequently flakes, particularly during final sealing of the glass bead to the case. This causes difficulty with the electrical performance of the finished diode. The purpose of the present invention is to electrolytically treat the lead tip 18 to avoid this flaking of copper. The electrolytic treatment may be designed to strip the copper from the lead tip, or it may be designed to apply a nickel coating over the copper. I prefer stripping, but either treatment may be performed by appropriate use of substantially the same apparatus.

Referring now to FIG. 7, an important part of the apparatus consists of a cup 20. This is preferably frusto-conical in configuration, as indicated at 22. The cup is conductive but nonmagnetic, and it preferably has a thin bottom 24. There is an additional wall 26 beyond the bottom 24, providing a socket which receives a magnet cluster, as later described. In the present case the cup is made of brass.

Referring now to FIG. 1, the cup 20 is preliminarily inverted over a container 28 carrying a large number of glass-beaded leads 30. In present practise, for small diodes, the leads have a length of about 1½ inches, and four hundred leads are packaged in a transparent cylindrical container, much like an ordinary pill box. The leads are packed with the beads at the lower end, but if not, may be inverted from one container into another. The cup 20 is dimensioned for convenient use with such containers.

Figure 2:
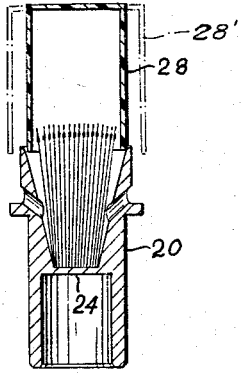
FIG. 2 shows the assembly inverted to transfer the leads to the cup.
Figure 3:
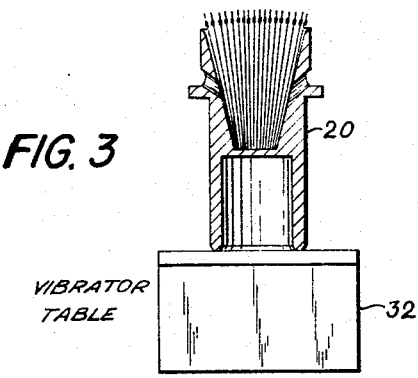
FIG. 3 represents the use of vibration to level the leads.

As shown in FIG. 1, the cup 20 is placed over the container 28, mouth to mouth, and the assembly is then inverted as shown in FIG. 2, thereby transferring the four hundred leads from container 28 to cup 20. The bottom 24 is preferably flat over its full area so that the leads will register in height at the lower ends. To help assure this the loaded cup 20 may be placed on a vibrator unit 32 (FIG. 3), thereby levelling the leads. The frusto-conical shape avoids criss-crossing of the leads, and causes them to fan outward, so that the beaded upper ends lie in a plane which is slightly convex.

Figure 4:
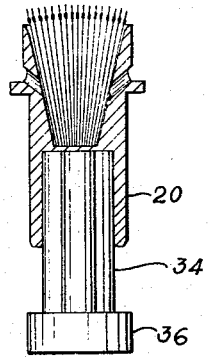
FIG. 4 illustrates the application of a multiple magnet to the cup to hold the leads in the cup.

Referring now to FIG. 4, a magnet assembly 34 is applied to the cup 20. More specifically, it is dimensioned to fit in and is inserted into the socket portion 26.

Preferably there are a plurality of cylindrical permanent magnets, the outer ends of which are secured to a nonmagnetic head 36, and the inner ends of which bear directly against the thin bottom 24 of the cup. As here illustrated, three cylindrical magnets are used. Because the three magnets are nested together and handled as a unit, the assembly of magnets may be referred to simply as a magnet. They are also shown in FIG. 10.

I have found it preferable to use multiple cylindrical magnets instead of a single magnet. They all have the same polarity, but the concentration of the magnetic lines of force is better distributed, and it then is easier to hold the four hundred leads in alignment. With a single large magnet there may be an excessive concentration of lines of force at the center axis of the magnet, with some tendency to displace the center leads. This tendency is minimized when using multiple magnets to cover the area of the cup bottom 24 as shown in FIG. 10.

Figure 5:
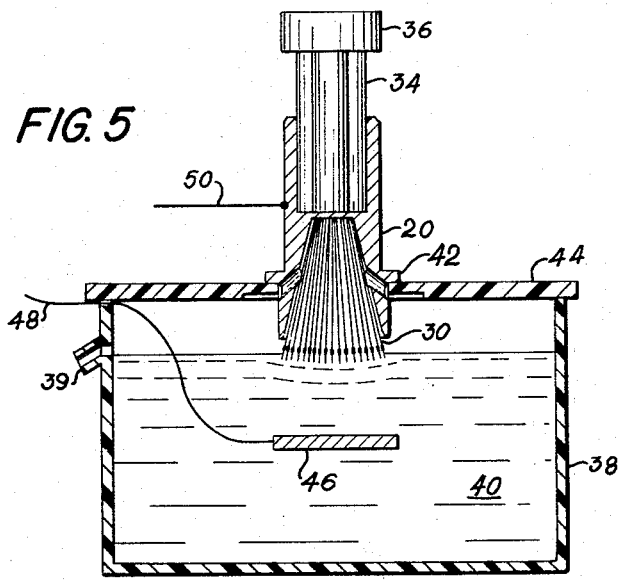
FIG. 5 shows the assembly of cup, magnet, and leads inverted over an electrolyte, and supported with only the lead tips immersed in the electrolyte.

Referring now to FIG. 5, the assembly of the cup 20, the magnet 34, and the leads 30 is inverted over a tank 38 containing a suitable electrolyte 40. The cup is flanged at 42 and rests on a support 44. The level is held constant, as by an overflow at 39. The dimensioning of the parts is so related to the level of the electrolyte that only the tips of the leads are immersed in the electrolyte. An electrode 46 is also immersed in the electrolyte. A suitable electrical connection 48 is used to apply an electric potential to the electrode 46, and another conductor 50 is used to apply an opposite potential to the inverted cup 20, so that the lead tips act as an opposite electrode for the desired electrolytic process.

If the copper is to be stripped from the lead tips, the electrode 46 is polarized negatively to act as a cathode, and the cup 29 is polarized positively. The electrolyte contains copper ions, and copper is transferred from the lead tips to the electrode 46.

If the lead tips are to be nickel plated, the electrode 46 is made of nickel and is polarized positively. Cup 29 is polarized negatively, and the electrolyte contains nickel ions. Nickel then is transferred from the electrode 46 to the lead tips.

After completion of the electrolytic treatment, the assembly of cup, magnet and leads is removed from the support 44. The leads may be rinsed while still in the cup, and if acid or other chemical treatment is desired, the lead tips may be held downward and immersed in the chemical while the magnets are still holding them in the cup. Before or after further rinsing, the magnet may be removed to release the leads, depending on whether it is preferred to have the container upright or inverted during rinsing.

In most cases the leads may be temporarily replaced in containers, for which purpose it is merely necessary to place a container over the cup, as shown in FIG. 2, and to then invert the assembly to the position shown in FIG. 1, thereby transferring the leads from the cup to a container. Alternatively, the cup, magnet, and lead assembly may be placed over a container in the position shown in FIG. 1, and the magnet then removed from the cup to release the leads. In either case it is convenient to employ at this time a container which is somewhat larger in diameter than the original container, as shown in broken lines at 28' in FIG. 2.

Suitable apparatus for the present purpose is shown schematically, but in somewhat greater detail, in FIG. 6 of the drawing. The tank 52 contains an electrolyte 54. The level of the electrolyte is maintained constant. This might be done by using an overflow pipe at the side, with simple hand addition from time to time, or with a circulating means to circulate electrolyte from a reservoir. However, in the present case I provide a level control means 56 which automatically adds electrolyte as needed from time to time to maintain a desired level as indicated at 58.

The support for the cup comprises an arm 60 pivoted at 62 so that it may be moved from the solid line position 60 outside the tank, to the broken line position 60' over the tank. The arm 60 has a preferably open-ended or U-shaped opening (FIG. 9) to receive the cup 20, the flange 42 serving to locate the cup against upward movement. The magnet 34 is held in the cup socket 26, and the assembly is held in proper position in arm 60, by means of a resilient holder or leaf spring 64. If desired, this also serves for electrical connection, a flexible lead 66 extending to the fixed end of the spring 64.

It will be understood that with this arrangement the cup and magnet assembly is readily inserted in arm 60 with the cup upright, and that when the arm is turned over the cup is inverted and the lead tips are immersed in the electrolyte. The position of the arm is determined by a suitable stop 68, and if desired this stop may be made adjustable, for proper relation to the level of the electrolyte. Alternatively, the electrolyte level may be changed by adjustment of the level control unit 56. Provision may be made for either or both adjustments.

In practice the tank 52 may extend in a direction perpendicular to the paper, and there may be a series of arms, say five arms like the arm 60 pivoted on a rod 62 extending parallel to the tank. The stop 68 is one of five such stops mounted on a common stop bar 70 extending parallel to rod 62. Thus a single operator may work more efficiently by loading and unloading different cups in sequence, thereby making use of the electrolytic treatment time for unloading, rinsing, loading, etc.

In FIG. 6 it will be seen that the anode is divided, there being anode strips 72 and 74 which extend generally parallel to the rod 62, the bar 70, and the tank wall. It has been found desirable to use anodes which are spaced apart instead of being directly beneath the cup, in order to reduce the flow of gas directly upward into the mass of lead tips and the cup.

Reverting to FIG. 7, the frusto-conical shape of the cup is desirable in order to hold the mass of leads rather precisely, without criss-crossing of the leads. If a cylinder is used, it may be difficult to put the tips into desired level and parallel relation because of criss-crossing of the leads at the bottom of the cup. The dimension of the cup therefore is related to the dimension of the leads being handled.

In the particular case here shown the leads are 1.645 inches long. The wire has a diameter of 0.020. The glass bead has a diameter of 0.054 with its inner ends spaced 0.132 from the tip. All these dimensions are in inches. In such case the cup has a depth of 1⅜ inches, a small diameter at the bottom 24 of ½ inch, and an outside diameter at the top of 1⅛ inch. The taper is 11½ degrees. The bottom 24 has a thickness of 1/32 inch. A number of holes indicated at 70 are provided for escape of gases formed in the electrolytic process. In the present case there are four such holes, as shown in the drawing. They have a diameter of about ⅛ inch, but are partly obstructed by the arm 60. The reverse slope avoids difficulty when sliding a bundle of leads into the cup.

The foregoing dimensions assume the loading of four hundred leads at a time, and the cup operates best if the load is maintained between three hundred ninety-five and four hundred five leads. The desirable thing is to avoid excessive tightness which may bend the leads, or excessive looseness which may encourage crossover or escape of leads.

Reverting to FIG. 5, it may be explained that the immersion of the lead tips involves a number of factors. Because of capillary action, the tip if immersed at all, tends to be wetted as far as the bead. Because of the bead there is no tendency to wet the rest of the lead. The surface tension of the liquid also affects the situation. A pillow of gas formed above the liquid tends to depress the liquid somewhat, so that it readily assumes the slightly arcuate or convex configuration defined by the mass of lead tips. In practise the adjustment of the depth of immersion is readily determined by experiment, but for reasons above explained, the immersion depth is not as critical as might be expected.

The bottom of the cup might be made somewhat concave, thus bringing the lead tips into a flat plane instead of the very slightly fanned or convex configuration here shown. However, for reasons above explained, it is believed simpler and better to keep the bottom of the cup flat, and to retain the somewhat convex relation of the lead tips.

It is believed that my improvement in the electrolytic treatment of glass-beaded lead tips, and the apparatus elements and method of use of the same, as well as the advantages thereof, will be apparent from the foregoing detailed description. It will also be apparent that while I have shown and described the invention in a preferred form, changes may be made without departing from the scope of the invention, as sought to be defined in the following claims.

What is claimed is:

1. Apparatus for electrolytically treating the tips of glass-beaded leads, said apparatus comprising an electrically conductive non-magnetic cup, a magnet positioned adjacent the bottom of the outside of the cup, said cup being dimensioned to receive a large number of the leads bunched together with the glass beaded tips projecting from the open end of the cup, a tank for electrolyte, an electrode immersed in said electrolyte, a support means for the cup on the tank whereby an assembly of cup, magnet, and leads held in said cup by said magnet may be inverted over the electrolyte and supported with only the tips of the leads in the electrolyte, an electrical connection to the electrode, and an electrical connection to the cup.

2. Apparatus for electrolytically treating the tips of glass-beaded leads, said apparatus comprising an electrically conductive nonmagnetic cup, a magnet positioned adjacent the bottom of the outside of the cup, said cup being dimensioned to receive a large number of the leads bunched together with the glass beaded tips projecting from the open end of the cup, a tank for electrolyte, an electrode immersed in said electrolyte, a support means for the cup on the tank whereby an assembly of cup, magnet, and leads held in said cup by said magnet may be inverted over the electrolyte and supported with only the tips of the leads in the electrolyte, means to apply an electric potential to the immersed electrode, and an opposite potential to the inverted cup so that the lead tips act as an opposite electrode for the desired electrolytic process.

3. Apparatus for electrolytically treating the tips of glass-beaded leads, said apparatus comprising an electrically conductive nonmagnetic frusto-conical cup having a relatively thin bottom, a magnet positioned adjacent the bottom of the outside of the cup, said cup being dimensioned to receive a large number of the leads bunched together with the glass beaded tips projecting from the open end of the cup, a tank for electrolyte, an electrode immersed in said electrolyte, a support means for the cup on the tank whereby an assembly of cup, magnet, and leads held in said cup by said magnet may be inverted over the electrolyte and supported with only the tips of the leads in the electrolyte, means to apply an electric potential to the immersed electrode, and an opposite potential to the inverted cup so that the lead tips act as an opposite electrode for the desired electrolytic process.

4. Apparatus for electrolytically treating the tips of glass-beaded leads, said apparatus comprising an electrically conductive non-magnetic cup having a bottom and a socket wall beyond said bottom, a magnet in said socket wall against the bottom of the cup, said cup being dimensioned to receive a large number of the leads bunched together with the glass beaded lead tips projecting from the open end of the cup, a tank for electrolyte, an electrode immersed in said electrolyte, a support movably mounted on said tank, said support detachably receiving a cup and magnet assembly, and arranged to support the assembly over the tank with the lead tips at the bottom in the electrolyte, an electrical connection to the electrode, and an electrical connection to the cup.

5. Apparatus for electrolytically treating the tips of glass-beaded leads, said apparatus comprising an electrically conductive nonmagnetic cup having a bottom and a socket wall beyond said bottom, a magnet in said socket wall against the bottom of the cup, said cup being dimensioned to receive a large number of the leads bunched together with the glass beaded led tips projecting from the open end of the cup, a tank for electrolyte, an electrode immersed in said electrolyte, a support movably mounted on said tank, said support detachably receiving a cup and magnet assembly, and arranged to support the assembly over the tank with the lead tips at the bottom in the electrolyte, a flexible electrical connection to a part of said support contacting the cup and through it to the leads, and an electrical connection for the immersed electrode.

6. Apparatus for electrolytically treating the tips of glass-beaded leads, said apparatus comprising an electrically conductive nonmagnetic frusto-conical cup having a bottom and a socket wall beyond said bottom, a magnet in said socket wall against the bottom of the cup, said cup being dimensioned to receive a large number of the leads bunched together, with the glass beaded lead tips projecting from the open end of the cup, a tank for electrolyte, an electrode immersed in said electrolyte, a support movably mounted on said tank, said support detachably receiving a cup and magnet assembly with the cup upright, and arranged to invert the assembly over the tank with the lead tips at the bottom in the electrolyte, a flexible electrical connection to a part of said support contacting the cup and through it to the leads, and an electrical connection to the immersed electrode.

7. Apparatus for electrolytically treating the tips of glass-beaded leads, said apparatus comprising an electrically conductive nonmagnetic frusto-conical cup having a relatively thin bottom and a socket wall beyond said bottom, a magnet in said socket wall against the bottom of the cup, said cup being dimensioned to receive a large number of the leads bunched together, with the glass beaded lead tips projecting from the open end of the cup, a tank for electrolyte, an electrode immersed in said electrolyte, a support movably mounted on said tank, said support detachably receiving a cup and magnet assembly with the cup upright, and arranged to invert the assembly over the tank with the lead tips at the bottom in the electrolyte, a flexible electrical connection to a part of said support contacting the cup and through it to the leads, an electrical connection to the immersed electrode, and a level control means associated with the tank for automatically maintaining a desired level of the electrolyte.

8. Apparatus for electrolytically treating the tips of glass-beaded leads, said apparatus comprising an electrically conductive non-magnetic frusto-conical cup dimensioned to receive a predetermined large number of the leads bunched together with the glass beaded tips projecting from the open end of the cup, means to hold the leads in the cup, a tank for electrolyte, an electrode immersed in said electrolyte, a support means whereby the cup and leads in said cup may be inverted over the electrolyte and supported with only the tips of the leads in the electrolyte, means to apply an electric potential to the immersed electrode, and an opposite potential to the inverted cup so that the lead tips act as an opposite electrode for the desired electrolytic process.

9. Apparatus as defined in claim 1 in which the magnet comprises a plurality of cylindrical magnets disposed collaterally in like polarity to cover most but not all of the area of the bottom of the cup.

10. Apparatus as defined in claim 3 in which the magnet comprises three cylindrical magnets disposed collaterally in like polarity to cover most but not all of the area of the bottom of the cup, there being a gap at the center of the cup.

11. Apparatus as defined in claim 1 in which the immersed electrode is divided and its parts are spaced apart straddling the axis of the cup, thereby reducing the flow of gas bubbles directly upward to the cup.

12. Apparatus as defined in claim 3 in which the immersed electrode is divided and its parts are spaced apart straddling the axis of the cup, thereby reducing the flow of gas bubbles directly upward to the cup.

13. Apparatus as defined in claim 1 in which the leads are copper plated, and in which the immersed electrode is a cathode, whereby the electrolytic process strips the copper coating from the lead tips.

14. Apparatus as defined in claim 1 in which the immersed electrode is a nickel anode, whereby the lead tips are nickel plated.

15. Apparatus as defined in claim 6 in which the leads are copper plated, and in which the immersed electrode is a cathode, whereby the electrolytic process strips the copper coating from the lead tips.

16. Apparatus as defined in claim 6 in which the leads are copper plated, and in which the immersed electrode is a nickel anode, whereby the copper coated lead tips are additionally nickel plated.

References Cited by the Examiner

UNITED STATES PATENTS

| | | | |
|---|---|---|---|
| 1,733,608 | 10/1929 | Knox et al. | 204—15 |
| 2,072,170 | 3/1937 | Herzog | 204—297 |
| 2,505,531 | 4/1950 | Ellwood. | |
| 3,007,855 | 11/1961 | Ellwood | 204—97 |

FOREIGN PATENTS

| | | |
|---|---|---|
| 353,332 | 7/1931 | Great Britain. |
| 1,116,639 | 5/1956 | France. |

JOHN H. MACK, *Primary Examiner.*

R. L. GOOCH, T. TUFARIELLO, *Assistant Examiners.*